US009253042B2

(12) United States Patent
Lumezanu et al.

(10) Patent No.: US 9,253,042 B2
(45) Date of Patent: Feb. 2, 2016

(54) NETWORK MANAGEMENT

(71) Applicant: NEC Laboratories America, Inc., Princeton, NJ (US)

(72) Inventors: Cristian Lumezanu, East Windsor, NJ (US); Curtis Yu, San Gabriel, CA (US); Vishal Kumar Singh, Princeton, NJ (US); Yueping Zhang, Princeton, NJ (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 283 days.

(21) Appl. No.: 14/041,102

(22) Filed: Sep. 30, 2013

(65) Prior Publication Data

US 2014/0098678 A1   Apr. 10, 2014

Related U.S. Application Data

(60) Provisional application No. 61/710,088, filed on Oct. 5, 2012.

(51) Int. Cl.
*G01R 31/08* (2006.01)
*H04L 12/24* (2006.01)
*H04L 12/26* (2006.01)

(52) U.S. Cl.
CPC ............ *H04L 41/12* (2013.01); *H04L 43/0876* (2013.01); *H04L 43/10* (2013.01); *Y02B 60/43* (2013.01)

(58) Field of Classification Search
CPC ..... H04L 41/12; H04L 43/0876; H04L 43/10; H04B 60/43
See application file for complete search history.

(56) References Cited

U.S. PATENT DOCUMENTS

| | | | | |
|---|---|---|---|---|
| 6,502,131 B1 * | 12/2002 | Vaid | ...................... | H04L 1/1854 709/224 |
| 6,816,903 B1 * | 11/2004 | Rakoshitz | ........... | H04L 12/2602 370/230 |
| 8,787,154 B1 * | 7/2014 | Medved | .................... | H04L 1/00 370/225 |
| 2003/0097438 A1 * | 5/2003 | Bearden | .............. | H04L 12/2697 709/224 |
| 2004/0246905 A1 * | 12/2004 | Dunagan | .................. | H04L 45/02 370/252 |
| 2013/0176852 A1 * | 7/2013 | Lumezanu | .............. | H04L 47/41 370/235 |
| 2013/0185438 A1 * | 7/2013 | Lumezanu | .......... | H04L 12/4641 709/226 |
| 2013/0191530 A1 * | 7/2013 | Zhang | .................... | H04L 43/08 709/224 |
| 2014/0064066 A1 * | 3/2014 | Lumezanu | .............. | H04L 47/12 370/229 |
| 2014/0098678 A1 * | 4/2014 | Lumezanu | .......... | H04L 43/0876 370/248 |
| 2014/0337674 A1 * | 11/2014 | Ivancic | ................... | H04L 43/50 714/43 |
| 2015/0117203 A1 * | 4/2015 | Filsfils | .................. | H04L 47/122 370/235 |

OTHER PUBLICATIONS

A Compiler and Run-time System for Network Programming Languages, Christopher Monsanto, Nate Foster, Rob Harrison, David Walker, POPL 2012, pp. 218-229.

(Continued)

*Primary Examiner* — Robert Wilson
(74) *Attorney, Agent, or Firm* — Joseph Kolodka

(57) ABSTRACT

A method implemented in a network apparatus used in a network is disclosed. The method includes sensing network topology and network utilization, receiving a request from an application, deciding path setup requirement using network state information obtained from the network topology and the network utilization, and translating the path setup requirement into a rule to be installed. Other methods, apparatuses, and systems also are disclosed.

10 Claims, 4 Drawing Sheets

(56) References Cited

OTHER PUBLICATIONS

Frenetic: A Network Programming Language, Nate Foster, Rob Harrison, Michael J. Freedman, Christopher Monsanto, Jennifer Rexford, Alec Story, David Walker, ICFP 2011, pp. 1-13.

OpenFlow-based server load balancing gone wild, Richard Wang, Dana Butnariu, Jennifer Rexford, Hot-ICE 2011, pp. 1-6.

* cited by examiner

NETWORK MANAGEMENT

This application claims the benefit of U.S. Provisional Application No. 61/710,088, entitled "FlowSense: A network manager for OpenFlow networks," filed on Oct. 5, 2012, the contents of which are incorporated herein by reference.

BACKGROUND OF THE INVENTION

The present invention relates to network management and, more specifically, to management for software-defined networks.

Software-defined networks separate the data plane (which performs packet forwarding) and control plane (which decides where to forward packets) in network devices, such as switches or routers (we refer to them simply as switches), by moving the control plane to a logically centralized machine, called the controller. The controller issues commands to the switches (e.g., add, delete, modify forwarding table entries, read state) using a set of APIs; the most popular such communication protocol between the network control and data planes is OpenFlow. OpenFlow enables fine-grained control over the network but is low-level and not suited for applications that have high-level requirements from the network. For example, a distributed application has end-to-end constraints about paths between its endpoints and does not want to (nor knows how to) concern itself about the low-level characteristics that the path needs to satisfy to meet the constraints (e.g., pass through a list of switches, etc.). Thus, there is a disconnect between how the applications want and know to interact with the network (simple interface, similar to the socket interface) and the OpenFlow protocol used to perform the interaction (complex, low-level).

Previous work builds a higher-level programming language on top of OpenFlow (e.g., Frenetic, NetCore) to express packet-forwarding policies. These efforts aim to optimize the OpenFlow forwarding rule generation and to synchronize rules from different applications. However, they are targeted to network operators and do not alleviate the complexity involved in interacting with the network.

We develop a network manager for networks (e.g. OpenFlow networks), called FlowSense. FlowSense interacts with applications using a simple API, translates application requests into OpenFlow rules and installs these rules on OpenFlow switches. FlowSense accepts application requests either to modify the network (e.g., install a path between two endpoints, with a specified bandwidth) or to monitor the network. To respond to these requests, FlowSense keeps an updated state of the network (e.g., topology, link utilizations) which it collects continually using OpenFlow. To install rules in the OpenFlow switches, FlowSense maintains a rule engine that optimizes the number of rules installed on switches. FlowSense offers a simple yet expressive interface to OpenFlow networks.

REFERENCES

[1] A Compiler and Run-time System for Network Programming Languages, Christopher Monsanto, Nate Foster, Rob Harrison, David Walker, POPL 2012.
[2] Frenetic: A Network Programming Language, Nate Foster, Rob Harrison, Michael J. Freedman, Christopher Monsanto, Jennifer Rexford, Alec Story, David Walker, ICFP 2011.
[3] OpenFlow-based server load balancing gone wild, Richard Wang, Dana Butnariu, Jennifer Rexford, Hot-ICE 2011.

BRIEF SUMMARY OF THE INVENTION

An objective of the present invention is to alleviate the complexity involved in interacting with the network.

An aspect of the present invention includes a method implemented in a network apparatus used in a network. The method includes sensing network topology and network utilization, receiving a request from an application, deciding path setup requirement using network state information obtained from the network topology and the network utilization, and translating the path setup requirement into a rule to be installed.

Another aspect of the present invention includes a non-transitory computer readable medium storing a program causing a computer to execute a process. The process includes sensing network topology and network utilization, receiving a request from an application, deciding path setup requirement using network state information obtained from the network topology and the network utilization, and translating the path setup requirement into a rule to be installed.

Still another aspect of the present invention includes a network apparatus used in a network. The network apparatus comprises sensing means for sensing network topology and network utilization, decision means for receiving a request from an application and deciding path setup requirement using network state information obtained from the network topology and the network utilization, and rule applying means for translating the path setup requirement into a rule to be installed.

DETAILED DESCRIPTION

FlowSense decreases the complexity that distributed applications face when interacting with the underlying network. It considerably lowers the barrier for deploying applications on OpenFlow networks, thereby promoting the deployment of OpenFlow itself.

Figure 1:
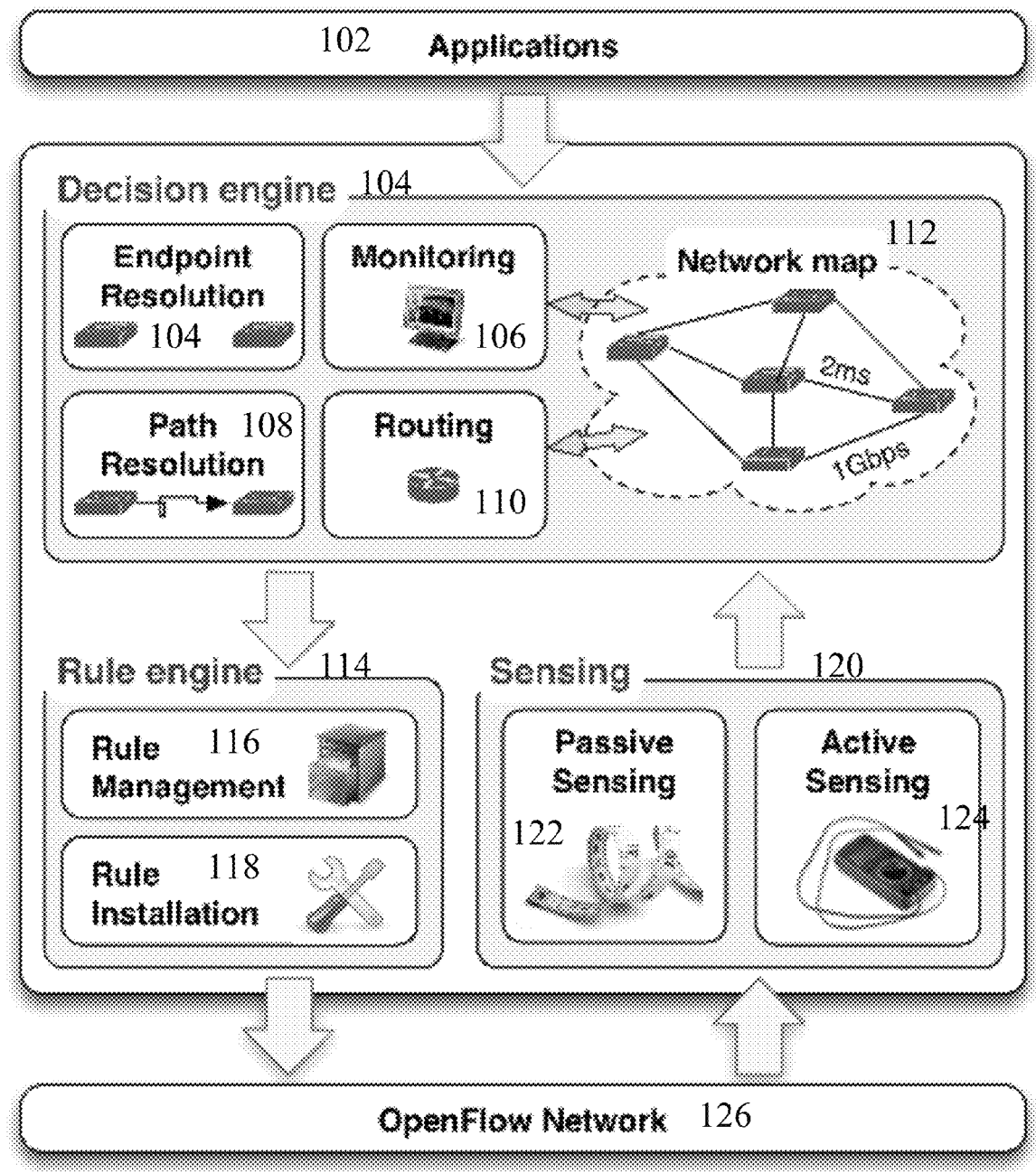
FIG. 1 depicts system architecture of FlowSense.

The system architecture of FlowSense is illustrated in FIG. 1.

FlowSense comprises, for example, three components: Sensing module 120, decision engine 104, and rule engine 114. Sensing module 120 uses both passive sensing 122 and active sensing 124 to monitor the current state of, for example, OpenFlow network 126, including the topology and the utilization on each link between switches. Decision engine 104 maintains map 112 of the network, which it constantly updates by contacting sensing module 120, receives queries from applications 102 using a simple yet expressive API and translates them into path setup requirements or monitoring requirements. It forwards path requirements to rule engine 114, whose main task is to translate such requirements into OpenFlow rules and installs the rules on switches. Decision engine 104 treats the monitoring requirements internally but can send requests to sensing module 120 for more fine-grained measurements if it deems necessary.

Figure 2:
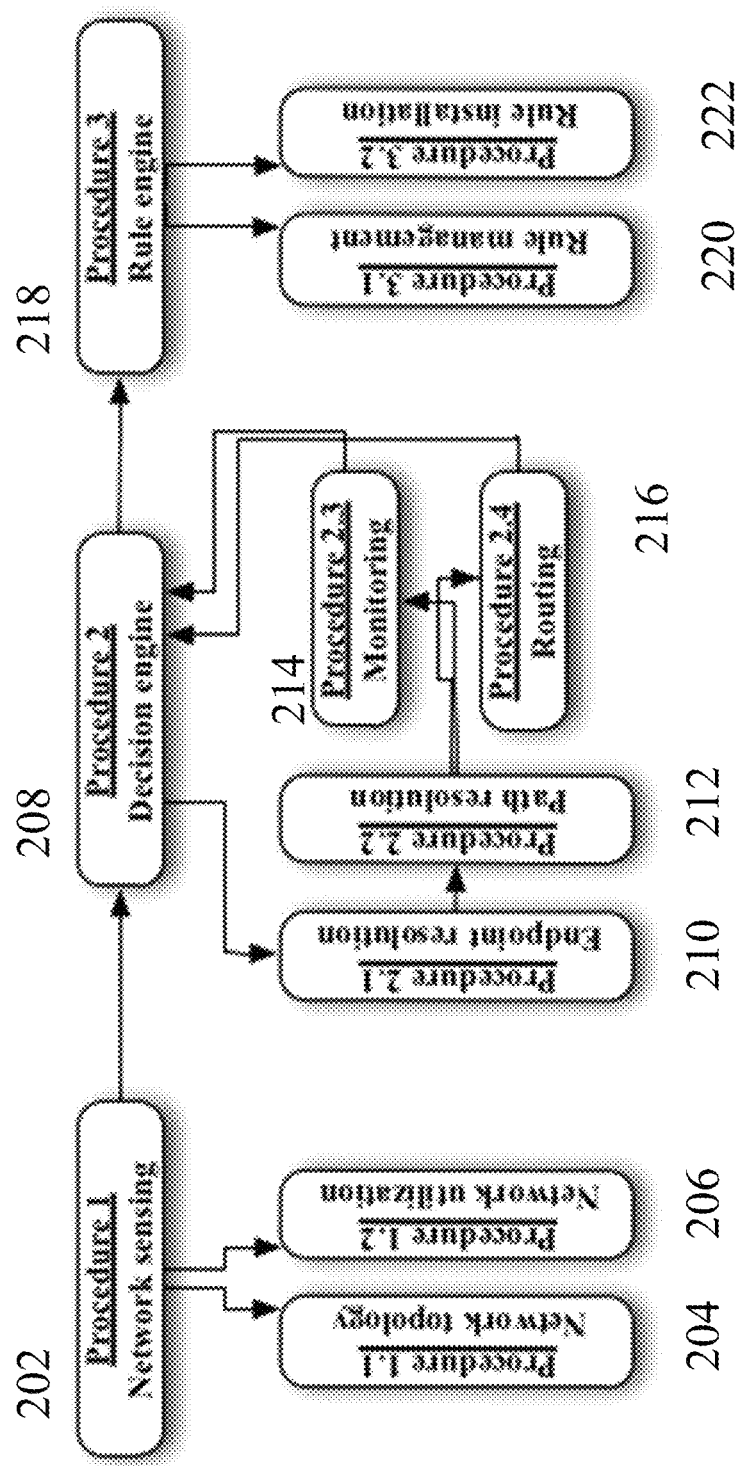
FIG. 2 depicts functionality of FlowSense.

The flow chart in FIG. 2 illustrates the functionality of FlowSense.

Below we describe each component of FlowSense in detail.

Procedure 1: Network Sensing 120 in FIGS. 1 and 2

This procedure infers the state of network 126 by computing the topology and the utilization of each link. It communicates the state of network 126 to decision engine 104 on request or at regular intervals. We describe the topology sensing in Procedure 1.1 and utilization sensing in Procedure 1.2

Procedure 1.1: Network Topology Sensing 202 in FIG. 2

This procedure infers the physical network topology by sending Link Layer Discovery Protocol (LLDP) packets (specified in standards document IEEE 802.1AB) from each switch, to infer links between switches, and by examining the OpenFlow rules installed on each switch, to infer to which switch is an endpoint connected.

Procedure 1.2: Network Utilization Sensing 204 in FIG. 2

To monitor the network utilization on each link, we use both active and passive methods.

Procedure 1.2.1 (An Active Method): Polling Switches

The procedure constantly polls the utilization counters on each switch using the ReadState OpenFlow message. The reply to this message contains the number of bytes transferred on the queried switch port (corresponding to a link to another switch). The network sensing module can receive requests from the decision engine to modify the polling interval on all or on a subset of switches.

Procedure 1.2.2 (A Passive Method): Capturing Control Messages

Because constantly polling switches takes a toll in terms of network overhead, the procedure also relies on passive monitoring of control traffic to infer utilization. Specifically, it captures FlowRemoved messages, which are triggered by switches on flow entry expiration. FlowRemoved messages contain information about the duration of the entry and the number of bytes that matched against it. By collecting data from multiple FlowRemoved messages, we are able to estimate utilization on certain links.

Procedure 2: Decision Engine 104

This procedure receives requests from applications and tries to satisfy them using the network state information obtained from Procedure 1. The applications specify request using the following API:

| Unit | Action | Target [value] |
|---|---|---|
| (IP, IP) | Monitor | Connectivity |
| | Create | Performance |
| | Delete | Policy [list of middleboxes] |

The API has, for example, three components. The unit represents the endpoint pair for which the application makes the request. In this procedure, we assume that the application specifies the endpoints in terms of IP addresses, since this is the most common addressing in the Internet. However, our procedure works similarly if we consider other ways of specifying endpoints, such as MAC addresses. The action represents what the application requests from the network. It can be (1) setup a new path between the endpoints (2) monitor the existing default path, or (3) remove default path between endpoints. Finally, the target represents the property associated with each action. We consider three different targets; 'connectivity' will try to either create a path between the two endpoints or monitor whether a path exists; 'performance' tries to create a path that satisfies a performance constraint (e.g., bandwidth) or monitor the performance of the default path; 'policy' creates a path that traverses the specified middleboxes or returns a list of middleboxes on the default path. If the action is 'monitor', the application can also specify a monitoring frequency.

The decision engine continually reads the network state from Procedure 1 and maintains a network map, which it uses to make decisions on application queries.

The decision engine comprises, for example, four components: endpoint resolution 104, path resolution 108, monitoring 106, and routing 110 in FIGS. 1 and 2.

Procedure 2.1: Endpoint Resolution 104 in FIGS. 1 and 2

The goal of this procedure is to detect where on the network an endpoint is located. This is important to detect the default path between a pair of endpoints that the application specifies and either monitor it or create a new one. We start the endpoint resolution with a switch that has a rule matching the endpoint IP (as a destination) and proceed in several ways.

A) If the action of the rule is to forward to an out port, we follow the corresponding link. If the link is present in the topology then we select the destination switch of the link and repeat the process. If the link is not present in the topology, then we conclude that it leads to the endpoint and infer that the endpoint is connected to the current switch.

B) If the action of the rule is other than forward to an outport, we select another switch in the topology that has a rule that matches the endpoint IP as a destination and repeat from beginning.

Procedure 2.2: Path Resolution 108 in FIGS. 1 and 2

The goal of this procedure is to find the current path between the pair of endpoints specified by the application. It starts with the switch connected to the first endpoint (the source) and looks for the most specific rule that matches the traffic between the two endpoints. If there exists such a rule and its action is forward to an outport, then we select the neighboring switch connected to the outport and repeat. If the action of the rule is not forward to an outport or if there is no rule matching the traffic between the endpoints, then we assume there is no route between the endpoints.

Procedure 2.3: Monitoring 106 in FIGS. 1 and 2

This procedure monitors the path between endpoints and is invoked only if the application requested path monitoring (by specifying the action 'monitor'). Depending on the target value in the application request, the procedure verifies if there exists a path between the endpoints (target="connectivity"), returns the performance value of the path (target is "bandwidth" or "latency"), or the list of known middleboxes on the path (target is 'policy'). To compute the bandwidth of a path, the procedure takes the path obtained from Procedure 2.2 and returns the maximum utilization across all links in the path. To generate a list of middleboxes for the path, the procedure looks at every switch on the path and identifies all rules with a forward action to a device other than a switch or the controller.

Procedure 2.4: Routing 110 in FIGS. 1 and 2

This procedure finds a path between two endpoints that satisfies the requirements specified by the application in the 'target' field of the query. We support several routing algorithms. If the query target is 'connectivity', the procedure finds the path with the fewest number of hops between the endpoints using Dijskstraa's shortest path algorithms. If the target is 'bandwidth', then we run the shortest-path algorithm and disallow the links that do not have the minimum requested bandwidth. For middlebox-aware routing, we first use the endpoint resolution described in Procedure 2.1 to determine where each middlebox is attached in the network. We then consider two options. If the order of middleboxes is strict, we run the shortest-path algorithm on each intermediate pair of nodes (e.g., (IP1, middlebox1), (middlebox1, middlebox2), etc.) and then stitch the obtained paths. If the order is not strict, we run the shortest-path algorithm between the endpoints until we find a path that traverses all switches to which middleboxes are connected or we run out of paths.

The result of this procedure is a list of switches that traffic between the endpoints should traverses. The decision engine sends this list to the rule engine.

Procedure 3: Rule Engine 114 in FIGS. 1 and 2

The rule engine receives from the decision engine a pair of endpoints (i.e., IP addresses) and the list of switches that traffic between the endpoints should traverse (i.e., the path), and generates OpenFlow rules that enforce the path on each switch. The procedure comprises, for example, two components: rule management and rule installation.

Procedure 3.1: Rule Management 116 in FIGS. 1 and 2

The goal of this procedure is to optimize the rules that we install on each switch. The set of rules that is installed on each switch should satisfy two properties: completeness and compactness. First, the rules should cover existing and upcoming traffic as much as possible and keep the packet processing on the switch. If no rule matches incoming traffic, the switch has to contact the controller, which creates additional network and processing overhead. Second, because the switches have limited memory, the number of rules on each switch should be minimized and wildcard rules should be used instead of microflow rules whenever possible.

The insight of this procedure is that several rules can be aggregated into one more general rule that matches traffic on multiple paths. By replacing the more specialized rules with one single general rule, we are able to improve the compactness of our rule set (i.e., fewer rules on switches) without sacrificing completeness.

We use binary tree structures to hold rules. A binary tree is a natural way to represent both IP addresses and IP prefixes. Each node corresponds to an IP prefix, and nodes closer to the root represent shorter prefixes. Leaf nodes represent full IP addresses. For each switch, the rule manager maintains two 32-level trees: source tree and destination tree. The rule optimization process works as follows:

1) Read endpoint pair and list of switches from decision engine;

2) if request is for path setup, generate, for each switch, an OpenFlow rule that matches the traffic between endpoints; a rule comprises a match part (used to identify packets that should follow the rule) and an action part (used to identify where to send these packets); if request is for path delete, then find all existing rules that match traffic between the endpoints on all switches in the list;

3) for each rule, for each switch: find the node in each tree where to associate the rule; start at the root of the source tree and the beginning of the source IP address or prefix in the match; go left in the tree if the next bit in the IP address is 0, right if it is 1; stop when the current depth is higher than the prefix size; if request is path setup, associate rule with current node, if request is path delete, mark rule inactive; repeat process for destination tree/destination IP, then repeat for each switch and each rule;

4) Aggregate or Split Rules

To ensure that the existing set of rules is compacted after adding a new rule to the tree, we perform rule aggregation. To ensure that the rules are still correct after a deletion (e.g., an aggregated rule might be incorrect if we deleted a rule that was part of the aggregation), we perform rule splitting.

Procedure 3.1.1: Rule Aggregation 404 in FIG. 4

This procedure aggregates rules into more general rules to save space in the switch memory. It works as follows:

1) start with all leaves in the subtrees rooted at the ancestors of the newly added rule (both source and destination trees); identify all rules associated with each leaf;

2) take all rules with the same action (from the set of rules identified at step 1) and create a set of rules for each action;

3) discard all sets of rules (from step 2) whose cardinality is under a pre-specified threshold;

4) for each action, compare its associated sets of rules in the source and destination trees; take the intersection between sets;

5) replace all rules in each action set with a more general rule; to perform this operation, mark all rules in the action set inactive and add the general rule at the root node of the subtree from step 1.

Figure 3:
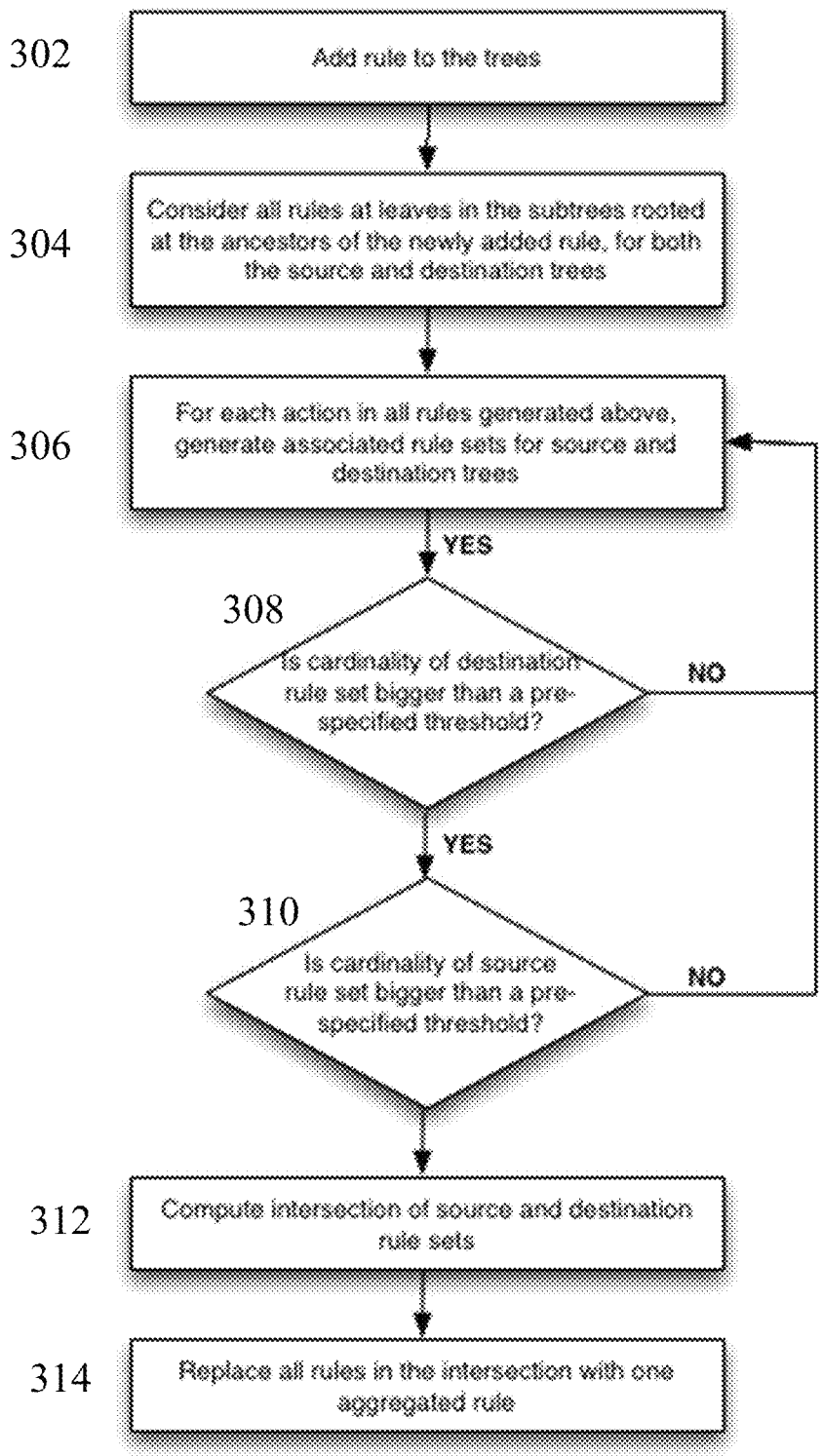
FIG. 3 depicts rule aggregation.

The rule aggregation is illustrated in FIG. 3:

Procedure 3.1.2: Rule splitting 406 in FIG. 4

This procedure splits an aggregated rule into its composing rules. It works as follows:

1) remove aggregated rule from both source and destination trees;

2) for each rule that was part of the aggregated rule, add it to the tree, unless it was specifically deleted following a path delete request, in which case remove it from the tree; adding a rule to the tree follows steps 2, 3, 4 from Procedure 3.1, with the change that aggregation is allowed only when it does not lead to overwriting another aggregated rule.

Procedure 3.2: Rule Installation 118 in FIGS. 1 and 2

This procedure takes all the active rules in each pair of source and destination trees and installs them on the switch using the OpenFlow protocol.

When Procedure 2 (endpoint resolution and path resolution) and Procedure 3 (rule management) are combined, for example, they offer a scalable, simple, and expressive management framework for applications to interact with and change OpenFlow networks. This is different from existing approaches, which aim to improve OpenFlow rule generation but do not reduce the complexity of interacting with the network. FlowSense, provides a simple interface to interact with the network and hides the complexity of the interactions within the decision engine. For scalability, it performs rule aggregation to optimize the amount of rules that are installed on switches and the amount of control traffic on the management channel.

Figure 4:
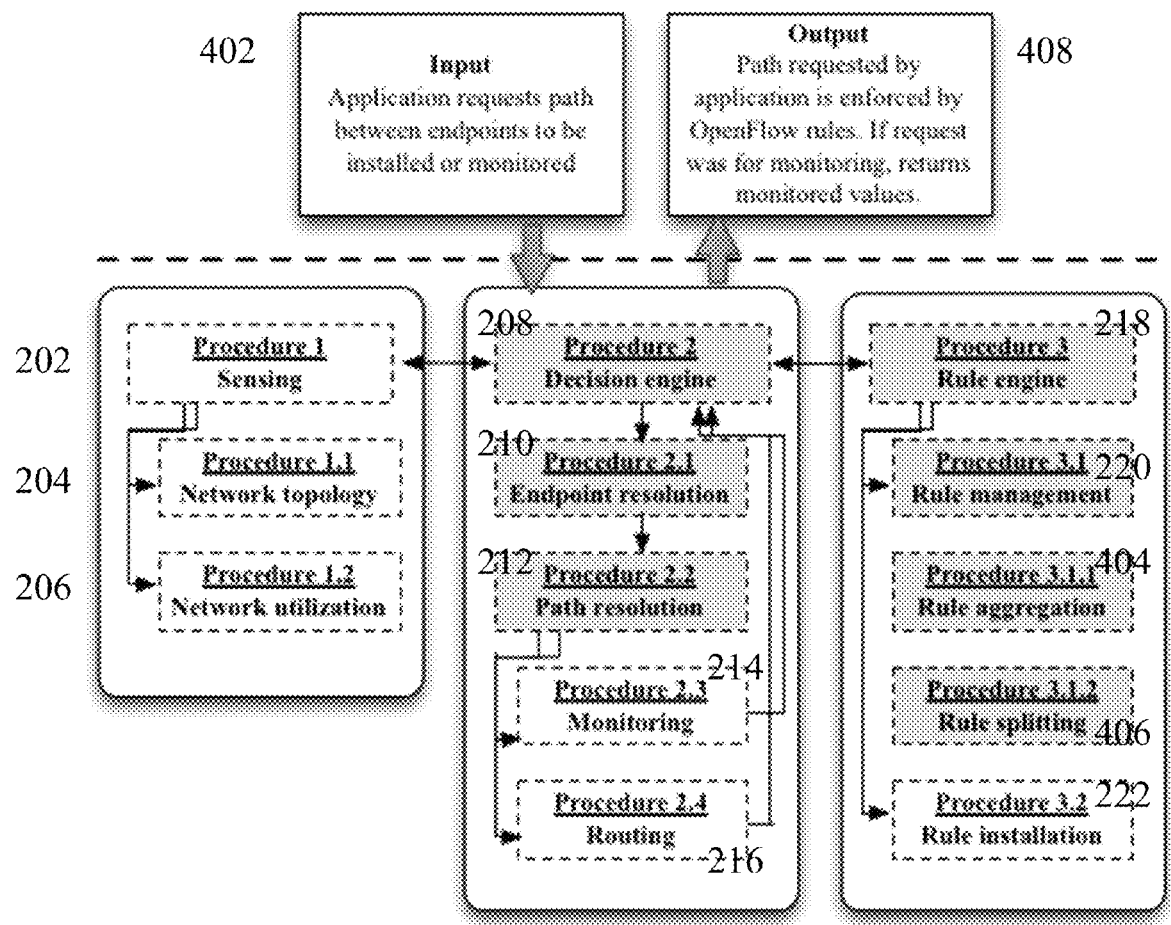
FIG. 4 depicts a process carried out by FlowSense.

FIG. 4 illustrates an process for FlowSense. Procedures 1, 1.1-1.2, 2, 2.1-2.4, 3, 3.1, and 3.2 are similar to those in FIG. 2. FIG. 4 explicitly shows input 402 and output 404. Input 402 is provided by application requests path between endpoints to be installed or monitored. In output 408, path requested by application is enforced by, for example, OpenFlow rules. If request was for monitoring, monitored values are returned.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a network apparatus used in a network, the method comprising:
   sensing network topology and network utilization;
   receiving a request from an application;
   deciding path setup requirement using network state information obtained from the network topology and the network utilization; and
   translating the path setup requirement into a rule to be installed;
   wherein the sensing of the network utilization comprises polling a utilization counter on each switch.

2. The method as in claim 1, further comprising:
   deciding monitoring requirement using network state information obtained from the network topology and the network utilization.

3. The method as in claim 1, wherein the network comprises a software defined network or an OpenFlow network.

4. The method as in claim 1, further comprising:
   maintaining a network map by network sensing; and
   using the network map to decide said at least one of path setup requirement and monitoring requirement.

5. The method as in claim 1, wherein the sensing of the network topology comprises:
   inferring physical network topology by sending a Link Layer Discovery Protocol (LLDP) packet from each switch; and
   examining an existing rule installed on each switch.

6. The method as in claim 1, wherein the decision of said at least one of path setup requirement and monitoring requirement comprises:
   detecting where on the network endpoints are located;
   finding a current path between a pair of endpoints specified by the application;
   monitoring the current path between the pair of endpoints in case the application requests path monitoring;
   finding, between the pair of endpoints, a path that satisfies the request received from the application; and
   making the path setup requirement,
   wherein the path setup requirement comprises a list of switches that traffic between the pair of endpoints traverses.

7. The method as in claim 6, wherein the translation of the path setup requirement comprises:
   reading the pair of endpoints and the list of switches;
   in case the request is for path setup,
      generating the rule, wherein the rule matches the traffic between the pair of endpoints,
      finding a node to associate the rule with, and
      associate the rule with the node; and
   in case the request is for path delete,
      finding an existing rule, wherein the rule matches the traffic between the pair of endpoints,
      marking the existing rule inactive.

8. The method as in claim 6, wherein the translation of the path setup requirement comprises:
   installing a rule on a switch.

9. A method implemented in a network apparatus used in a network, the method comprising:
   sensing network topology and network utilization;
   receiving a request from an application;
   deciding path setup requirement using network state information obtained from the network topology and the network utilization; and
   translating the path setup requirement into a rule to be installed,
   wherein the sensing of the network utilization comprises capturing a message triggered by a switch on flow entry expiration.

10. A non-transitory computer readable medium storing a program causing a computer to execute a process including:
    sensing network topology and network utilization;
    receiving a request from an application;
    deciding path setup requirement using network state information obtained from the network topology and the network utilization; and
    translating the path setup requirement into a rule to be installed;
    wherein the sensing of the network utilization comprises polling a utilization counter on each switch.

* * * * *